Nov. 13, 1934.   P. C. ROTHERMEL   1,980,931
PERCOLATOR
Filed Sept. 10, 1932   2 Sheets-Sheet 2
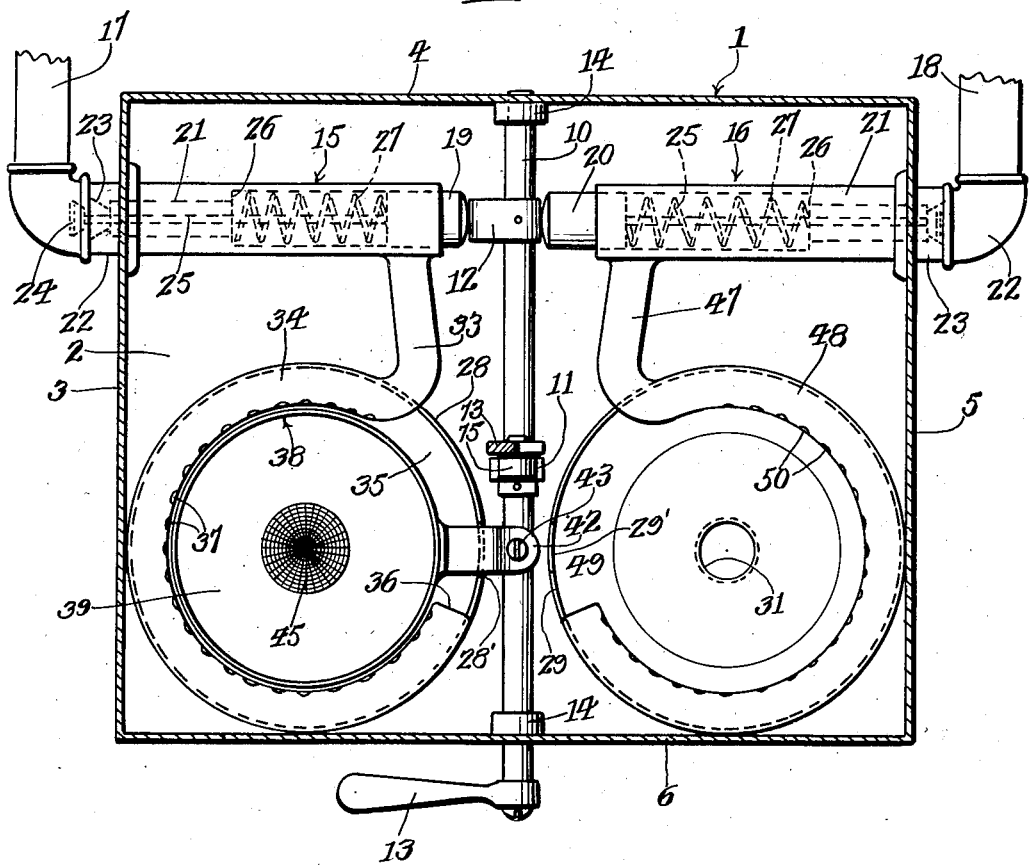
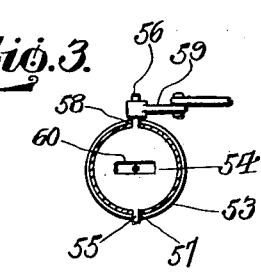
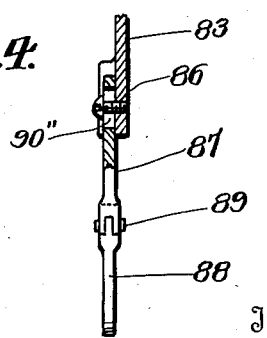
Inventor
Paul C. Rothermel
By Geo. T. Kimmel
Attorney Patented Nov. 13, 1934

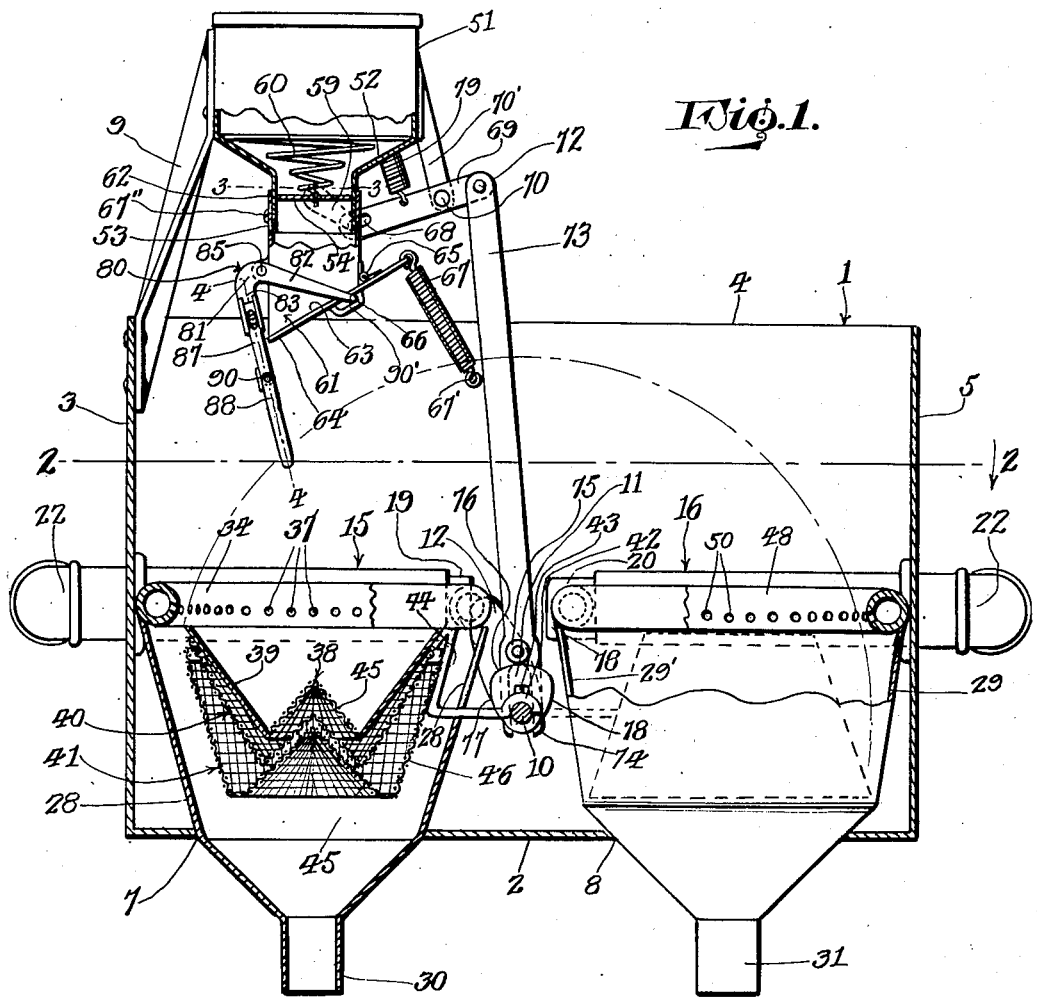

1,980,931

UNITED STATES PATENT OFFICE 1,980,931

PERCOLATOR

Paul C. Rothermel, Portland, Oreg.

Application September 10, 1932, Serial No. 632,594

9 Claims. (Cl. 53—3)

This invention relates to a percolator designed primarily for making a beverage from coffee or tea, but it is to be understood that a percolator, in accordance with this invention, may be employed in any connection for which it may be found applicable, and the invention has for its object for expeditiously making a fresh individual cup of coffee beverage in substantially the same time that it would require to fill a cup with a coffee beverage from an urn, thereby eliminating the making of more beverage than is necessary and the making of the beverage before it is needed resulting in a more palatable beverage than that which is made by an urn or similar device.

Further objects of the invention are to provide, in a manner as hereinafter set forth, a percolator for the purpose referred to which is simple in its construction and arrangement, strong, durable, sanitary, automatic in its action, thoroughly efficient for the purpose intended, conveniently actuated to a position for preparing the beverage and for cleaning the device when necessary, readily assembled and comparatively inexpensive to manufacture.

To the above ends essentially and to others which may hereinafter appear, the invention consists of such parts, and such combination of parts which fall within the scope of the invention as claimed.

In the drawings:

Figure 1 is a vertical sectional view of the percolator.

Figure 2 is a section on line 2—2 Figure 1.

Figure 3 is a section on line 3—3 Figure 1.

Figure 4 is a section on line 4—4 Figure 1.

Referring to the drawings in detail, 1 denotes a square open top casing which may, if desired be provided with a removable cover, not shown. The casing 1 includes a bottom 2 and side walls 3, 4, 5 and 6. The bottom is formed with a pair of spaced aligning openings 7, 8 between the longitudinal median thereof and the wall 3. The walls of openings 7, 8 are beveled to provide seats for a purpose to be referred to.

Secured to the inner face of wall 3 and extending above the top edge of such wall is a supporting bracket 9.

Journaled in the walls 4, 6 is a rock shaft 10 carrying a cam 11 and a pusher 12, the latter being spaced from the former. One end of shaft 10 extends outwardly with respect to wall 6 and carries a handle 13. Collars 14 are secured to the inner faces of walls 4, 6 and in which shaft 10 operates.

Supported by walls 3, 5 are a pair of alternately operable water feed controlling mechanisms 15, 16 arranged in endwise opposed spaced relation and between the inner ends thereof the pusher 12 operates for alternately opening such mechanisms to supply water to the percolator for a purpose to be presently referred to. The mechanisms 15 is attached to a hot water feed line 17. The mechanism 16 is connected to a hot water or cold water feed line 18. The mechanisms 15, 16 are of like construction and include spring controlled plungers 19, 20 respectively. Each mechanism also includes a tubular housing 21 from the inner end of which extends its plunger. The housing 21 extends outwardly from the wall from which it is supported. The outer end of the housing is connected by an elbow coupling 22 to a feed line. The housing 21 within and at the outer end thereof is formed with a tapered valve seat 23 engageable by a valve 24 for the purpose of closing the coupling 22 to the housing. Attached to valve 23 is one end of a stem 25. The outer end of stem 25 is secured to the inner end of a plunger. The housing 21, intermediate its ends is formed with an internal annular shoulder 26. Surrounding valve stem 25 and interposed between shoulder 26 and the inner end of a plunger is a coiled controlling spring 27 functioning to normally project the plunger in the path of pusher 12.

Arranged within casing 1 and seated upon the walls of openings 7, 8 are upstanding flared funnels 28, 29 respectively which depend below bottom 2 and have restricted lower or discharge end portions 30, 31 respectively. The funnels 28, 29 are arranged in parallel spaced relations positioned forwardly of the mechanisms 15, 16 respectively and cut out or slotted in one side as at 28', 29 respectively.

Extending forwardly from and communicating with the housing 21 of mechanism 15 is a water supply line 33 which opens into a horizontally disposed, substantially circular, tubular, water conducting and discharging element 34 supported upon and extending inwardly from the top edge of funnel 28. There is a space 35 between the point of joinder of line 33 with element 34 and the free end 36 of the latter to provide a clearance for a purpose to be referred to. The inner side of element 34 is formed with water discharge ports 37.

Carried by the shaft 10 is a percolating element 38 comprising a series of superposed spaced foraminous members 39, 40 and 41, connected together for bodily movement and said members are also connected to an arm 42 which is fixed at one end, as at 43 to shaft 10. The arm 42 is for selective passage through slots 28', 29' and includes an angled portion 44 to which the foraminous members 39, 40, and 41 are secured. Each of said members is formed of an upstanding cone-shaped portion 45 and an inverted frusto-conical portion 46 which terminates at its bottom into the lower end of portion 45. The latter is of less height than and is surrounded by portion 46. The element 38 is moved into and out of funnel 28 for a purpose to be referred to. The outer diameter of member 41 is materially less than the inner diameter of funnel 28. The arm 42 provides means for suspending element 38 within and in spaced relation with respect to funnel 28. The arm 42 when suspending element 38 in funnel 28 is arranged in the clearance provided by space 35.

Extending forwardly from and communicating with the housing 21 of mechanism 16 is a water supply line 47 which opens into a horizontally disposed, substantially circular, tubular, water conducting and discharging element 48 supported upon and extending inwardly from the top edge of funnel 29. There is a space 49 between the point of joinder of line 47 with element 48 and the free end 49 of the latter to provide a clearance for arm 42. The inner side of element 48 is formed with water discharge ports 50.

Secured to the upper portion of bracket 9 and arranged in vertical alignment, that is to say directly over funnel 28, is a container 51 for the coffee. The container includes a flared bottom 52 opening into a tubular depending valve controlled outlet member or spout 53. Positioned in the latter is a shut-off valve 54 formed with a pivot 55 and a stub shaft 56 arranged diametrically opposite the former. The pivot 55 and shaft 56 are mounted in openings 57, 58 respectively formed in member 53. Shaft 56 is provided with a crank arm 59. The valve 54 is slotted, as at 60 and extending through the slot is the lower end of a coiled spring 60. The connection between valve 54 and spring 60 is such as to permit the lower end of the spring to slide relatively to the valve. The spring is of the inverted cone type and seats at its top upon and is secured to bottom 52 of container 51. The spring functions to provide an agitating action on the material within the container, due to the fact that it can shift relative to valve 54.

Adjustably connected to the member 53 and depending from the latter is a gate controlled material measuring element 61 comprising a sleeve 62 which encompasses and depends from member 53. The sleeve 62 is vertically adjustable relative to member 53 for the purpose of controlling the desired amount of material to be supplied to the percolating element 38 when the latter is suspended in funnel 28. The lower end 63 of sleeve 62 is beveled and normally seated against said end for closing it is a spring controlled hinged gate 64. The latter is hinged, intermediate its ends, as at 65 to sleeve 62. The gate 64 has depending therefrom, in proximity to hinge 65 a yoke 66. The gate 64 is disposed at a downward inclination from its rear to its forward end. The rear or upper end of gate 64 is attached to the upper end of a coiled controlling spring 67. The lower end of the latter is anchored in any suitable manner within casing 1 and may be secured to a fixed cross rod or bracket 67'. The sleeve 62 is adjustably connected to member 53, as at 67''.

Attached to the crank arm 59 by a pin and slot connection 68 is the forward end of a lever 69. The latter is mounted on a pivot 70 carried by a hanger 70' depending from the container 51. The rear end of lever 71 is pivotally connected as at 72 to the upper end of a vertically movable shifting rod 73. The lower end of the latter is bifurcated, as at 74 and straddles shaft 10 at one side of cam 11. Carried by the lower end of rod 73 is a roller 75 against which rides cam 11. The latter includes a high part 76 and a pair of low parts 77, 78. A pulling spring 79 is attached to container 51 and to lever 69 for the purpose of elevating the forward end of the lever to open valve 54, when roller 75 is seated on one of the low parts of cam 11. When roller 75 is seated on the high part of cam 11 the lever 69 will be held from shifting on its pivot by rod 73, as the latter cannot be lowered until a low part of the cam is presented to roller 75.

An adjustable opening device 80 for gate 64 is connected to and depends from sleeve 62. The device 80 includes a bell crank 81 formed of a long and a short arm 82, 83 respectively. The arm 82 is pivotally connected to sleeve 62, as at 85. Adjustably connected to arm 83, as at 86 is a trip member formed of an upper and a lower section 87, 88 respectively. The sections are pivotally connected together as at 89. The movement of section 88 in an outward direction with respect to section 87 is arrested by a stop 90. The arm 82 has an angular extension 90' which slidably operates in yoke 66. The section 87 is adjustably connected to arm 83 as at 90''.

The normal position of handle 13 is extending upwardly from shaft 10 whereby the pusher 12 will be in a neutral position with respect to plungers 19, 20; the arm 12 vertically disposed; the low part 77 of cam 76 positioned against roller 75; the element 38 clear of funnels 28, 29; the valve 54 opened whereby a quantity of material has been supplied to element 61 and the gate 64 closed. Now it will be assumed that a cup of beverage is desired. The handle 13 is shifted to the position shown in Figure 2, whereby element 38 will be suspended in funnel 28. As element 38 moves towards funnel 28 it will strike the section 88 of the trip member, rock lever 81 in a direction to have arm 82 act on gate 64 to open the latter whereby the material supplied to element 61 will be discharged into element 38. As shaft 10 moves in a direction towards funnel 28, the high part of cam 11 will act on rod 73 to prevent the shifting of lever 71 by spring 79, and lever 71 will act on crank arm 59 to close valve 54. As shaft 10 moves in the direction stated, pusher 12 will act upon plunger 19 and shift the latter in a direction to open valve 24 of mechanism 15 whereby a supply of hot water will be had to element 34 and discharged into element 38 containing the material from which the beverage is made. A cup, not shown, to receive the beverage will be arranged below the restricted end 30 of funnel 28. The arrangement of the parts and timing thereof will be such that the water will not be supplied to element 38 until it is suspended in funnel 28. The material from element 61 will start to discharge into element 38 immediately after the latter contacts with the trip member to shift bell crank 81. When element 38 is in suspended position in funnel 28, the high part 76 of cam 11 will be against roller 75 and spring 79 will not act upon lever 71 to open valve 54. Immediately upon element 38 clearing the trip member, spring 67 will close gate 64.

Now it will be assumed the material in element 38 is to be discharged. Handle 13 is moved to a position just the opposite to that shown in Figure 2

2, shaft 10 is carried therewith and the low part 77 of cam 11 permits rod 73 to lower whereby spring 79 will act upon lever 69 so the latter will open valve 54 to enable a supply of material from element 51. When element 38 moves in a direction from funnel 28 to be suspended in funnel 29, it does not actuate the trip member as an entirety, but only swings section 88 of such member rearwardly on its pivot. As shaft 10 moves in a direction towards funnel 29 the pusher 12 will release plunger 19 and operate on plunger 20, so as to open line 18 to element 48 whereby a supply of water will be had to act upon element 38 to clean it of any of the material from which the beverage was made, and such material will be discharged through funnel 29. When the element 38 is suspended in an inverted manner in funnel 29 the high part of cam 11 will bear against roller 75 and prevent a pulling action of spring 79 on lever 69.

The trip member is adjustably connected to the arm 83 of bell crank 81 to provide for the positioning of section 88 of the trip member in the path of element 38 when the sleeve 62 is vertically adjusted relative to the outlet member 53.

The percolator may be mounted upon any suitable support, or anchored in any desirable position.

What I claim is:—

1. In a percolator for making a coffee beverage, a vertically disposed stationary funnel for the discharge of the beverage, a removable percolating element permanently open at its top and carrying a body of coffee, said element adapted for suspension in spaced relation to and within said funnel below the top of the latter, a normally closed water supply conduit having a part thereof extending around the major portion of and seated upon the length of the upper end of the funnel, said part of said conduit extending inwardly with respect to the inner face of the funnel and having its inner side provided with ports for discharging water upon the body of coffee when the conduit is open thereby providing a coffee beverage discharging from the funnel, and a shiftable suspension structure at one side of the funnel having a combined suspension and coupling means for removably suspending said element within the funnel and means for maintaining a water feed open to the conduit when said element is in suspended position, the said part of said conduit having spaced opposed portions providing a clearance at the top of the funnel for said combined suspending and coupling means for said element.

2. In a percolator for making a coffee beverage, a vertically disposed stationary funnel for the discharge of the beverage, a removable percolating element permanently open at its top and carrying a body of coffee, said element adapted for suspension in spaced relation to and within said funnel below the top of the latter, a normally closed water supply conduit having a part thereof extending around the major portion of and seated upon the length of the upper end of the funnel, said part of said conduit extending inwardly with respect to the inner face of the funnel and having its inner side provided with ports for discharging water upon the body of coffee when the conduit is open thereby providing a coffee beverage discharging from the funnel, a shiftable suspension structure at one side of the funnel having a combined suspension and coupling means for removably suspending said element within the funnel and means for maintaining a water feed open to the conduit when said element is in suspended position, the said part of said conduit having spaced opposed portions providing a clearance at the top of said funnel and said funnel being cutout at one side to provide a clearance coacting with said other clearance for said combined suspension and coupling means for said structure.

3. In a percolating apparatus for making a coffee beverage, a pair of vertically disposed stationary parallel spaced funnels, one for the discharge of the made beverage and the other for the discharge of the residuum resulting from the making of the beverage, a normally closed water supply conduit having a part thereof extending around the major portion of the length of and seated upon the upper end of that funnel for the discharge of the made beverage, said part having its inner side provided with ports adapted when the conduit is open to a water feed for discharging water upon a body of coffee suspended in such funnel by a removable percolating element to make the beverage, a normally closed water supply conduit extending around the major portion of the length of and seated upon the upper end of that funnel for the discharge of the residuum, said second mentioned conduit part having its inner side provided with ports adapted when such conduit is open to a water feed for discharging water upon the residuum dumped from the percolating element, an oppositely shiftable percolating element suspension structure arranged between said funnels having a combined suspension and coupling means for said element for selectively shifting the element to beverage making position and to dumping position and means common to said conduits for opening said conduit at the top of the beverage discharge funnel to a water feed when said element is in beverage making position and for opening said conduit at the top of the residuum discharge funnel to a water feed when said element is in dumping position, said conduit parts having spaced opposed portions providing clearances at the top of said funnels, and said funnels being formed in the upper portions thereof with upstanding opposed spaced parallel cutouts forming clearances coacting with the clearances provided by said conduit parts to provide for the passage of said combined suspension and coupling means into and out of said funnels.

4. In a coffee beverage percolating apparatus of that type including a funnel in which the coffee beverage is made and an oppositely shiftable element for suspension in and removable from the funnel, a container for ground coffee adapted to be arranged in superposed spaced relation with respect to said funnel and provided with a normally closed shut-off valve, a normally closed gate controlled ground coffee measuring element adjustably connected to and suspended from the outlet end of said container, said measuring element being provided with a gate opening means slidably connected with the gate and operated from the percolating element on the movement of the latter in one direction, said gate being spring controlled to provide for the closing thereof when the gate opening means is clear of the percolating element, and an oppositely shiftable structure bodily carrying the percolating element and providing when shifted in one direction for the operating of said gate opening means by the percolating element whereby a measured quantity of coffee will be supplied to said percolating element, said structure including means when said structure is shifted in the opposite direction to provide for the opening of the valve of the container for the discharge of ground coffee therefrom into the measuring element.

5. In a coffee beverage percolating apparatus, a ground coffee measuring device adapted to have ground coffee intermittently supplied thereto, said device including a shiftable normally closed spring controlled outlet gate therefor, actuable means depending from said device for moving said gate to open position, said actuating means being pivoted and slidably connected to said gate and a shiftable open top percolating element movable to and from percolating position below said device, said means being permanently positioned in the path of said element when the latter moves to and from percolating position and engaged and actuated by said element as the latter moves to percolating position to open said gate whereby a measured amount of coffee will be supplied to said element, and said means having coacting parts to prevent the actuation thereof by said element when the latter is moved from percolating position.

6. In a percolator for making a coffee beverage and of that type including a coffee beverage discharging funnel having a clearance in one side, a coffee grounds discharging funnel having a clearance arranged in parallel spaced relation to said other clearance, a pair of normally closed selectively opened water feeds and a percolating element, a manually operated rockable structure for alternately shifting the percolating element containing a body of coffee into and for suspending it within the beverage discharging funnel in beverage making position and from such position into and for suspending it within the coffee grounds discharging funnel in a position for dumping the body of coffee grounds therein and for selectively opening water feeds for respectively supplying water to the beverage discharging funnel for making the beverage and to the grounds discharging funnel for flushing off the grounds from said element, said structure including a shaft positioned between the funnels and below said water feeds, an arm including a horizontal part fixed to the shaft for selectively passing through said clearances and an upstanding part adapted to be anchored to one side of said element and a pusher extended laterally from the shaft rearwardly of said arm, common to and for selectively opening the water feeds.

7. In a percolator for mixing a coffee beverage, an upstanding funnel shaped beverage discharging element open at its top and bottom, a housing, said element partly within and having its lower portion depending from the bottom of the housing, said element being supported intermediate its ends by the bottom of the housing, a water supply conduit having a portion thereof greater than a half circle seated on and extending within the upper end of and its remaining portion extended rearwardly from said element, a normally closed valve controlled water feed opening into said rearwardly extending portion, said circular portion having its inner side formed with discharge ports, a foraminous open top percolating element substantially of inverted frustoconoidal contour for removable suspension in spaced relation to and within said discharge element below said circular portion and adapted to hold a body of ground coffee, an oppositely shiftable structure including a combined suspension and coupling means for the percolating element, the said part circular portion forming a clearance at the top of said discharge element, said discharge element being cutout at one side to provide a clearance coacting with said other clearance for the passage of said combined suspension and coupling means when positioning and removing the percolating element within and from the discharge element, and said structure provided with means spaced from said combined suspension and coupling means for opening a water feed to said conduit when the percolating element is suspended within the discharge element.

8. In a percolator for making a coffee beverage, an upstanding hollow open top and closed bottom element in which the beverage is made and from which the made beverage is discharged, an oppositely shiftable, suspendable, open top percolating means for successively receiving separate bodies of coffee to successively support said bodies within said element, a normally closed valve controlled water feeding means having a ported portion thereof seated upon said element for discharging water upon a body of coffee supported by said percolating means, a ground coffee measuring device arranged in superposed spaced relation with respect to the open top of said element for successively discharging bodies of coffee into said percolating means, said device including a shiftable normally closed spring controlled outlet gate therefor, a pivotally mounted gate opening means slidably connected to said gate, suspended from said device, arranged in the path of, abutted by said percolating means in both directions of its travel and provided with means substantially as described having provisions operated by said percolating means when the latter moves respectively in a direction to enter said element to open the gate for a body of coffee to be supplied to said percolating means and when the latter moves away from said element to permit the opening of the gate, and an oppositely shiftable structure supported adjacent one side of said element and provided with a combined suspension and coupling means for said percolating means and with means for opening the valve of the water feeding means when the percolating means is suspended in said element.

9. In a percolator for making a coffee beverage, an upstanding hollow open top and closed bottom element in which the beverage is made and from which the made beverage is discharged, an oppositely shiftable, suspendable, open top percolating means for successively receiving separate bodies of coffee to successively support said bodies within said element, a normally closed valve controlled water feeding means having a ported portion thereof seated upon said element for discharging water upon a body of coffee supported by said percolating means, a ground coffee measuring device arranged in superposed spaced relation with respect to the open top of said element for successively discharging bodies of coffee into said percolating means, said device including a shiftable normally closed spring controlled outlet gate therefor, a pivotally mounted gate opening means slidably connected to said gate, suspended from said device, arranged in the path of, abutted by said percolating mean in both directions of its travel and provided with means substantially as described having provisions operated by said percolating means when the latter moves respectively in a direction to enter said element to open the gate for a body of coffee to be supplied to said percolating means and when the latter moves away from said element to permit the opening of the gate, an oppositely shiftable structure supported adjacent one side of said element and provided with a combined suspension and coupling means for said percolating means and with means for opening the valve of the water feeding means when the percolating means is suspended in said element, and said element being formed in said side with an upstanding cutout providing a clearance for said combined coupling and suspension means on the shifting of the percolating means into and out of said element.

PAUL C. ROTHERMEL.